(12) United States Patent
Kenworthy et al.

(10) Patent No.: US 6,488,752 B1
(45) Date of Patent: Dec. 3, 2002

(54) MONOAZO DYESTUFFS, A COMPOSITION AND AN INK FOR INK JET PRINTING COMPRISING THEM

(75) Inventors: Mark Kenworthy, Manchester (GB); Ronald Wynford Kenyon, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/623,082

(22) PCT Filed: Feb. 16, 1999

(86) PCT No.: PCT/GB99/00479
§ 371 (c)(1), (2), (4) Date: Aug. 28, 2000

(87) PCT Pub. No.: WO99/43754
PCT Pub. Date: Sep. 2, 1999

(30) Foreign Application Priority Data

Feb. 28, 1998 (GB) .............................................. 9804175

(51) Int. Cl.⁷ .......................... C09D 11/00; C09B 29/42
(52) U.S. Cl. ..................................... 106/31.48; 534/772
(58) Field of Search ........................ 106/31.48; 534/772

(56) References Cited

U.S. PATENT DOCUMENTS

| | | | | |
|---|---|---|---|---|
| 4,167,509 A | * | 9/1979 | Parton ......................... | 534/606 |
| 4,739,042 A | * | 4/1988 | Lorenz et al. ............ | 106/31.35 |
| 5,015,292 A | * | 5/1991 | Bruder et al. ............ | 106/31.48 |
| 5,023,324 A | * | 6/1991 | Moser ......................... | 162/162 |
| 5,059,683 A | * | 10/1991 | Moser et al. ................ | 534/606 |
| 5,413,630 A | | 5/1995 | Schwarz et al. .......... | 106/31.48 |
| 5,543,259 A | | 8/1996 | Schwarz et al. ............ | 430/106 |
| 5,929,218 A | * | 7/1999 | Lee et al. .................. | 106/31.48 |
| 6,140,478 A | * | 10/2000 | Geiwiz et al. ............... | 534/759 |
| 6,303,763 B1 | * | 10/2001 | Meyrick et al. ......... | 106/31.45 |

FOREIGN PATENT DOCUMENTS

| | | |
|---|---|---|
| EP | 0 325 973 | 8/1989 |
| WO | WO 86/01815 | 3/1986 |

* cited by examiner

Primary Examiner—Helene Klemanski
(74) Attorney, Agent, or Firm—Pillsbury Winthrop LLP

(57) ABSTRACT

Compounds of Formula (1) and salts and tautomers thereof, inks containing a compound of Formula (1), an ink jet printing process using the inks, substrates printed with the inks and ink jet printer cartridges containing the inks:

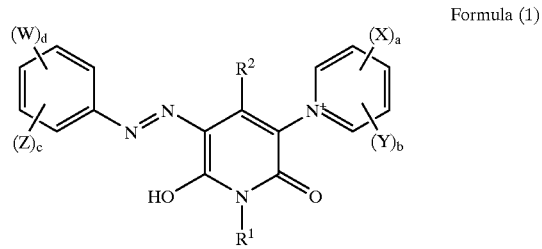

Formula (1)

wherein:
  $R^1$ and $R^2$ each independently is H, optionally substituted alkyl, optionally substituted aryl or optionally substituted arylalkyl;
  each W and each X independently is —COOH, —SO$_3$H, —PO$_3$H$_2$ or alkyl substituted by one or more groups selected from —COOH, —SO$_3$H and —PO$_3$H$_2$;
  each Y and each Z independently is a substituent other than those defined for W and X;
  a and d each independently is 1 to 5;
  b and c each independently is 0 to 4;
  (a+b) has a value of 5 or less; and
  (c+d) has a value of 5 or less.

20 Claims, No Drawings

MONOAZO DYESTUFFS, A COMPOSITION AND AN INK FOR INK JET PRINTING COMPRISING THEM

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the present invention there is provided a compound of Formula (1) and salts and tautomers thereof:

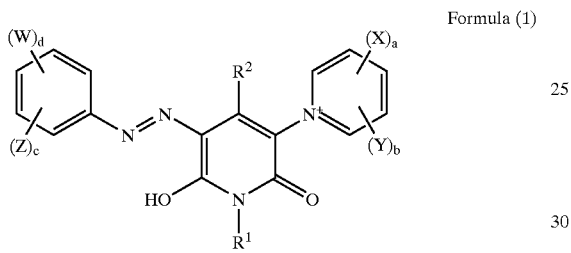

Formula (1)

wherein:
$R^1$ and $R^2$ each independently is H, optionally substituted alkyl, optionally substituted aryl or optionally substituted arylalkyl;
each W and each X independently is —COOH, —$SO_3H$, —$PO_3H_2$ or alkyl substituted by one or more groups selected from —COOH, —$SO_3H$ and —$PO_3H_2$;
each Y and each Z independently is a substituent other than those defined for W and X;
a and d each independently is 1 to 5;
b and c each independently is 0 to 4;
(a+b) has a value of 5 or less; and
(c+d) has a value of 5 or less.

b and c are preferably each independently 0, 1 or 2, more preferably 0 or 1.

a and d are preferably each independently 1, 2, or 3, more preferably 1 or 2.

Preferably (a+b) has a value of 1, 2 or 3, more preferably 1 or 2. Preferably (c+d) has a value of 1, 2 or 3, more preferably 2 or 3.

The compounds of Formula (1) are preferably mono azo compounds (i.e. they contain only one azo (—N=N—) group).

Preferably each W and each X independently is —COOH, —$SO_3H$, —$PO_3H_2$ or $C_{1-10}$alkyl (more preferably $C_{1-6}$-alkyl) substituted by one, two or three (more preferably one) groups selected from —COOH, —$SO_3H$, and —$PO_3H_2$.

More preferably each W and each X independently is —COOH, —$SO_3H$ or $C_{1-6}$-alkyl substituted by —COOH or —$SO_3H$. It is especially preferred that each X is —COOH. It is especially preferred that each W independently is —COOH or —$SO_3H$.

Preferably at least one W is ortho to the azo group (—N=N—).

Preferably Y and Z are each independently optionally substituted aryl, optionally substituted arylalkyl, halogen (especially F and Cl), nitro, cyano, —$CF_3$, —$OR^3$, —$NR^4R^5$, —$SR^6$, —$C(O)R^7$, —$C(O)OR^8$, —$SO_2R^9$, —$SOR^{10}$ or alkyl optionally substituted by a group other than —$SO_3H$, —COOH or —$PO_3H_2$; or Z together with the carbon atom to which it is attached and a second carbon atom in the phenyl group form a 5- or 6-membered ring;

wherein:
$R^3$ is H, optionally substituted alkyl or optionally substituted aryl;
$R^6$ is H, optionally substituted alkyl, optionally substituted aryl or a group of the Formula (2);
$R^7$, $R^8$, $R^9$ and $R^{10}$ are each independently optionally substituted alkyl or optionally substituted aryl;
$R^4$ and $R^5$ are each independently H, optionally substituted alkyl, optionally substituted aryl, —$CO(C_{1-6}$-alkyl), —$CONH_2$, a group of the Formula (2) or $R^4$ and $R^5$ together with the nitrogen to which they are attached form a 5- or 6- membered ring:

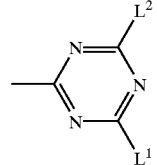

Formula (2)

$L^1$ and $L^2$ each independently is —$OR^{11}$, —$SR^{12}$ or —$NR^{13}R^{14}$;
$R^{11}$ and $R^{12}$ each independently is H, optionally substituted aryl or optionally substituted alkyl; and
$R^{13}$ and $R^{14}$ each independently is H, optionally substituted aryl, optionally substituted alkyl, —$CO(C_{1-6}$-alkyl) or —$CONH_2$ or $R^{13}$ and $R^{14}$ together with the nitrogen to which they are attached form an optionally substituted morpholine or piperazine ring.

In a preferred embodiment Y and Z are each independently optionally substituted aryl, optionally substituted arylalkyl, halogen (especially F and Cl), nitro, cyano, —$CF_3$, —$OR^3$, —$NR^4R^5$, —$SR^6$, —$C(O)R^7$, —$C(O)OR^8$, —$SO_2R^9$, —$SOR^{10}$ or alkyl optionally substituted a group other than —$SO_3H$, —COOH or —$PO_3H_2$; wherein $R^3$, $R^4$, $R^5$, $R^7$, $R^8$, $R^9$ and $R^{10}$ are as hereinbefore defined and $R^6$ is H, optionally substituted alkyl or optionally substituted aryl.

Preferably $R^7$, $R^8$, $R^9$ and $R^{10}$ are each independently optionally substituted alkyl.

When any of Y and Z is optionally substituted alkyl it is preferably optionally substituted $C_{1-10}$-alkyl, more preferably $C_{1-6}$alkyl optionally substituted by —OH, nitro, cyano, halogen (especially F or Cl), amino, —NH($C_{1-4}$-hydroxyalkyl) or —NH($C_{1-4}$-alkyl).

When any of $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ is optionally an substituted alkyl it is preferably optionally substituted $C_{1-10}$-alkyl, more preferably optionally substituted $C_{1-6}$-alkyl. Preferred optional substituents are —OH, —COOH, —$SO_3H$, —$PO_3H_2$, nitro, amino and halogen (preferably F or Cl), more especially Cl, —OH, —COOH and —$SO_3H$.

When any of $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ is optionally substituted aryl it is preferably optionally substituted phenyl or optionally substituted naphthyl, especially optionally substituted phenyl. Preferred optional substituents are $C_{1-4}$-alkoxy, ($C_{1-4}$-hydroxyalkoxy)-$C_{1-4}$-alkoxy-, —OH, —COOH, —SO$_3$H, —CF$_3$, amino, —NH($C_{1-4}$-alkyl), —NH($C_{1-4}$-hydroxyalkyl), —NH(—CO($C_{1-4}$-alkyl)), halogen (especially F or Cl), nitro, —CO($C_{1-4}$-alkyl), —SO$_2$($C_{1-4}$alkyl) and $C_{1-4}$-alkyl optionally substituted by —OH, —COOH and —SO$_3$H.

When any of $R^1$, $R^2$, Y or Z is arylalkyl it is preferably optionally substituted phenyl-(alkylene)- or optionally substituted naphthyl-(alkylene)- more preferably optionally substituted phenyl-($C_{1-6}$-alkylene)- or optionally substituted naphthyl-($C_{1-6}$-alkylene)- and especially optionally substituted benzyl. Preferred optional substituents on the arylalkyl groups are those listed above for the aryl groups, more preferably $C_{1-4}$-alkyl, $C_{1-4}$-alkoxy, —SO$_3$H, —COOH, amino, nitro, F or Cl.

When Z together with the carbon atom to which it is attached and a second carbon atom in the phenyl group form a 5- or 6-membered ring, the group attached to the azo group of Formula (1) is preferably a substituted indanyl group, more preferably a group of the Formula (A):

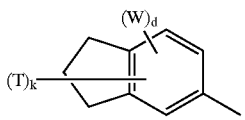

Formula (A)

wherein:
k is 0, 1 or 2;
W and d are as hereinbefore defined; and
each T independently is as hereinbefore defined for Z.

Preferably each T independently is $C_{1-6}$-alkyl or $C_{1-6}$-alkoxy each of which is optionally substituted by —OH.

In Formula (A) k is preferably 0. Preferably d is 1 or 2. It is especially preferred in Formula (A) that k is 0, d is 1 or 2 and at least one W is ortho to the azo group in Formula (1).

When $R^4$ and $R^5$ together with the nitrogen to which they are attached form a 5 or 6 membered ring it is preferably optionally substituted morpholine or optionally substituted piperazine.

Preferred optional substituents on the rings which may be formed by $R^4$ and $R^5$, and $R^{13}$ and $R^{14}$, together with the nitrogen to which they are attached are selected from —OH, —COOH, —SO$_3$H, $C_{1-4}$-alkoxy and $C_{1-4}$-alkyl optionally substituted by —OH, —COOH or —SO$_3$H.

$R^7$, $R^8$, $R^9$ and $R^{10}$ are preferably each independently $C_{1-4}$-alkyl, more preferably methyl or ethyl.

When $R^4$ or $R^5$ is a group of the Formula (2), the other group attached to the nitrogen ($R^5$ and $R^4$ respectively) is preferably H or $C_{1-4}$-alkyl.

Preferably each Z and each Y is free from —COOH, —SO$_3$H and —PO$_3$H$_2$ groups.

Preferably $R^1$ is H, optionally substituted $C_{1-10}$-alkyl, optionally substituted phenyl or optionally substituted phenyl-($C_{1-6}$-alkylene), more preferably H, phenyl, benzyl or $C_{1-6}$-alkyl optionally substituted by —OH, —SO$_3$H or —COOH, especially H or $C_{1-4}$-alkyl, more especially H.

Preferably $R^2$ is optionally substituted $C_{1-10}$-alkyl, optionally substituted phenyl or optionally substituted benzyl, more preferably phenyl, benzyl or $C_{1-6}$-alkyl optionally substituted by —OH, —COOH or —SO$_3$H, especially $C_{1-4}$-alkyl, more especially methyl or ethyl.

Preferably each Y independently is $C_{1-4}$-alkyl.

It is especially preferred that the pyridinium group in the compounds of Formula (1) is substituted only by one or two groups represented by X (i.e. b is 0 and a is 1 or 2 in Formula (1)). In this embodiment X is preferably —COOH.

When a is 1 it is preferred that the group represented by X (preferably —COOH) is at the 3-position on the pyridinium ring.

In view of the forgoing preferences, a preferred compound of the Formula (1) comprises a compound of the Formula (3) and salts thereof:

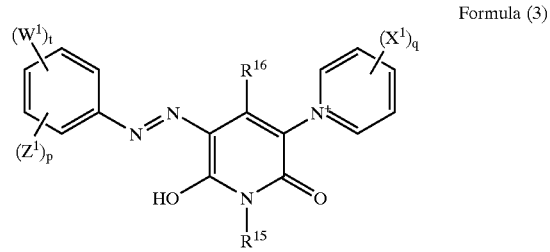

Formula (3)

wherein:
each $X^1$ and each $W^1$ independently is —COOH, —SO$_3$H or $C_{1-6}$-alkyl substituted by —COOH or —SO$_3$H;
$R^{15}$ is H or $C_{1-6}$-alkyl optionally substituted by —OH, —SO$_3$H or —COOH;
$R^{16}$ is $C_{1-4}$-alkyl;
each $Z^1$ independently is optionally substituted phenyl, halogen (especially F and Cl), nitro, cyano, —CF$_3$, —OR$^3$, —NR$^4$R$^5$, —SR$^6$, —C(O)R$^7$, —C(O)OR$^8$, —SO$_2$R$^9$, —SOR$^{10}$ or alkyl optionally substituted by a group other than —COOH, —SO$_3$H or —PO$_3$H$_2$;
q is 1 or 2;
t is 1 or 2; and
p is 0, 1 or 2;
wherein $R^3$, $R^4$, $R^5$, $R^6$, $R^7$, $R^8$, $R^9$ and $R^{10}$ are as hereinbefore defined.

Preferably each $X^1$ is —COOH.
Preferably each $W^1$ is independently —COOH or —SO$_3$H.
Preferably each $Z^1$ is independently Cl, F, nitro, cyano, hydroxy, $C_{1-6}$-alkoxy, —CO($C_{1-6}$-alkyl), —CO($C_{1-6}$-hydroxyalkyl), —COO($C_{1-4}$-alkyl), —NR$^{16}$R$^{17}$ or $C_{1-6}$alkyl optionally substituted by —OH, —F, —Cl or —NR $^6$R $^7$, wherein $R^{16}$ and $R^{17}$ each independently is H, $C_{1-4}$-hydroxyalkyl-, —CONH$_2$, —CO($C_{1-4}$alkyl), $C_{1-4}$-alkyl optionally substituted by —OH, —SO$_3$H, —COOH or —NH$_2$, or $R^{16}$ and $R^{17}$ together with the nitrogen to which they are attached form a morpholine or piperazine ring. It is especially preferred that each $Z^1$ independently is $C_{1-4}$-alkyl optionally substituted by —OH, more especially methyl or ethyl.

$R^{15}$ is preferably H or $C_{1-4}$-alkyl, more preferably H.
$R^{16}$ is preferably methyl or ethyl, more preferably methyl.
It is especially preferred that q is 1 and $X^1$ is —COOH attached at the 3-position on the pyridinium ring.

In another preferred embodiment:
q is 1;
$X^1$ is —COOH attached at the 3-position on the pyridinium ring;
t is 1 or 2;
each $W^1$ independently is —COOH or —SO$_3$H;
p is 0, 1 or 2; and
each $Z^1$ independently is Cl, —NHCO($C_{1-4}$-alkyl) or $C_{1-4}$-alkyl optionally substituted by —OH.

The compounds of Formula (1) may be prepared by coupling the diazonium salt of an amine of the Formula (4) with approximately 1 molar equivalent of a compound of the Formula (5):

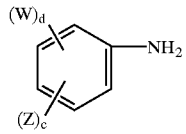

Formula (4)

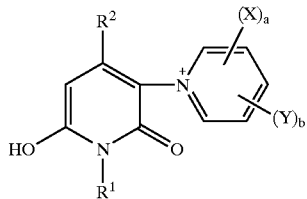

Formula (5)

wherein $R^1$, $R^2$, W, X, Y, Z, a, b, c and d are as hereinbefore defined.

The coupling reaction is preferably performed at a pH in the range 6 to 8, more preferably 7. Preferably the coupling reaction is performed at ambient temperature.

The diazotisation of the amine of the Formula (4) is preferably performed in an aqueous medium at a pH below 7 in the presence of a suitable diazotising agent.

Preferably the diazotising agent is formed in situ, for example by dissolving an alkali metal nitrite (preferably sodium nitrite) in a molar excess of a suitable mineral acid (preferably HCl).

The compound of the Formula (5) may be prepared by condensing a compound of the Formula (6) with a compound of the Formula (7):

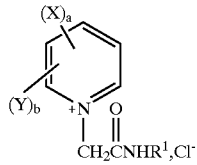

Formula (6)

wherein $R^1$, $R^2$, X, Y, a and b are as hereinbefore defined.

The condensation is preferably performed under alkaline conditions.

Preferably the condensation is performed at a temperature of from 80 to 100° C.

The compound of Formula (6) is preferably prepared by condensing the compound of the Formula (8) with the chloroacetamide of the Formula Cl—CH$_2$CONHR$^1$:

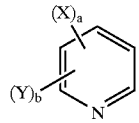

Formula (8)

The compounds of the present invention may be in the free acid or salt form. Preferred salts are water-soluble, for example alkali metal salts, especially lithium, sodium and potassium salts, ammonium and substituted ammonium salts and mixed salts thereof. Especially preferred salts are salts with sodium, lithium, ammonia and volatile amines, more especially sodium salts.

The compounds of the present invention are conveniently synthesised in the form of an alkali metal, for example Na salt. This may be converted into a different salt using known techniques. For example, an alkali metal salt of a dye may be converted wholly or partially into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis. Alternatively the alkali metal ion may be partially or wholly exchanged for an optionally substituted ammonium ion by a conventional ion exchange method.

It is to be understood that the present invention covers all tautomeric forms of the compounds of Formula (1) and (3). For example the compound of Formula (9) which is the hydrazo tautomer of the compound of Formula (1):

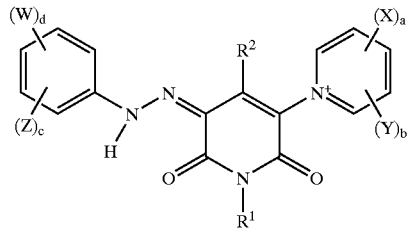

Formula (9)

wherein W, X, Y, Z, $R^1$, $R^2$, a, b, c and d are as hereinbefore defined.

It is believed that the hydrazo tautomer of the Formula (9) predominates over the azo form of the compound shown as Formula (1).

The present invention is intended to cover a single compound of the Formula (1) and compositions comprising two or more compounds of the Formula (1), or one or more compounds of the Formula (1) and one or more dyes other than a compound of Formula (1). Preferred compositions include:

(i) a composition comprising one or more compound(s) of the Formula (1) and one or more yellow dyes other than a compound of the Formula (1);

(ii) a composition comprising one or more compound(s) of the Formula (1) and one or more black dyes; and (iii) a composition comprising one or more compound(s) of the Formula (1), one or more black dyes and one or more yellow dyes other than a compound of the Formula (1).

Preferred yellow dyes for use in the compositions are water-soluble azo and bis azo dyes, for example C.I. Direct Yellow 86, C.I. Direct Yellow 132, C.I. Direct Yellow 142, C.I. Direct Yellow 173 and C.I. Acid Yellow 23.

Preferred black dyes for use in the compositions include water-soluble azo, bis azo and tris azo dyes, for example C.I. Direct Black 19, C.I. Direct Black 168, C.I. Direct Black 195, C.I. Direct Black 286 and C.I. Direct Black 287.

The hereinbefore described compositions may also comprise one or more water-soluble cyan dyes, for example C.I. Direct Blue 199 or C.I. Acid Blue 9.

The compounds according to the present invention are useful as a colorant in inks, especially inks used in ink jet printing processes. The compounds (especially in the form of a salt with an alkali metal, ammonia or a volatile amine) exhibit a high solubility in aqueous media and provide bright yellow prints which exhibit a high chroma and a high light-fastness.

According to a second aspect of the present invention there is provided an ink comprising a compound or composition according to the first aspect of the present invention and a medium.

Preferably the medium is a liquid medium or a low melting point solid.

A preferred ink comprises:
(a) from 0.01 to 30 parts in total of one or more compound(s) of the Formula (1) or (3) or a salt thereof; and
(b) from 70 to 99.99 parts of a liquid medium or a low melting point solid medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methylpyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially 2-methoxy-2-ethoxy-2-ethoxyethanol.

A preferred liquid medium comprises:
(a) from 75 to 95 parts water; and
(b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Another preferred liquid medium comprises:
(a) from 60 to 80 parts water;
(b) from 2 to 20 parts diethylene glycol; and
(c) from 0.5 to 20 parts in total of one or more solvents selected from 2-pyrrolidone, N-methylpyrrolidone, cyclohexanol, caprolactone, caprolactam, pentane-1,5-diol and thiodiglycol;

wherein the parts are by weight and the sum of the parts (a), (b) and (c)=100.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C, especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organicsolvent free from water it is a mixture of 2 to 5 different organic solvents. This allows a medium to be selected which gives good control over the drying characteristics and storage stability of the ink.

Ink media comprising an organic solvent free from water are particularly useful, where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The dye of Formula (1) or (3) may be dissolved in the low melting point solid or may be finely dispersed in it.

The ink may also contain additional components conventionally used in ink jet printing inks, for example viscosity and surface tension modifiers, pH buffers, corrosion inhibitors, biocides, kogation reducing additives and surfactants which may be ionic or non-ionic.

Preferably the pH of the ink according to the second aspect of the present invention is from 2 to 8, more preferably from 3 to 6 and especially from 4 to 6.

The compounds according to the first aspect of the present invention exhibit a high solubility in water. Accordingly it is preferred that the ink medium is water or a mixture of water and one or more water soluble organic solvent(s). An especially preferred ink comprises:

(a) from 0.01 to 30, more preferably 1 to 5 parts of a compound of Formula (1) or (3);

(b) from 75 to 98, more preferably 75 to 97 parts water; and (c) from 2 to 30, more preferably 2 to 25 parts of water-soluble organic solvent;

wherein all parts are by weight and the sum of the parts (a)+(b)+(c)=100.

A third aspect of the invention provides a process for printing an image on a substrate comprising applying thereto by means of an ink jet printer an ink containing a compound of the Formula (1) or (3) or salt thereof.

The ink used in this process is preferably as defined in the second aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available treated papers include HP Premium Coated Paper (available from Hewlett Packard Inc), HP Photopaper (available from Hewlett Packard Inc), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon).

A fourth aspect of the present invention provides a paper, an overhead projector slide or a textile material printed with an ink according to the second aspect of the present invention, or by means of a process according to the third aspect of the present invention.

A fifth aspect of the present invention provides an ink jet printer cartridge containing an ink, wherein the ink contains a compound according to the first aspect of the present invention.

The ink in the cartridge is preferably an ink according to the second aspect of the present invention.

The invention is further illustrated by the following Examples in which all parts and percentages are by weight unless otherwise stated.

EXAMPLE 1

Dye (1)

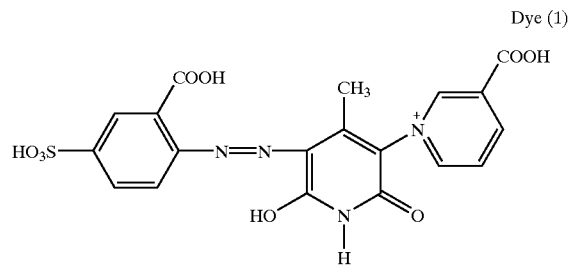

Dye (1)

Dye (1) was prepared as the sodium salt as follows:

Stage (a): Preparation of Intermediate (A)

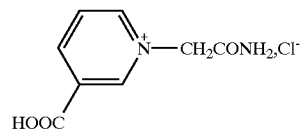

Intermediate (A)

Chloroacetamide (339.4 g at 98% strength) was added to N,N-dimethylformamide (DMF) (2l). To the resulting solution was added nicotinic acid (466.4 g at 98% strength) followed, by further DMF (800ml) whilst warming the mixture to 90° C. The mixture was stirred at this temperature for 2½ hours and allowed to self cool to room temperature. The resulting precipitate was filtered off, washed with acetone and dried under vacuum at 50° C. to give Intermediate (A). (Yield=478 g).

Stage (b): Preparation of Intermediate (B):

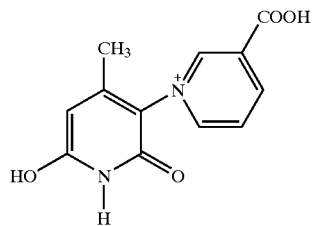

Intermediate (B)

Intermediate (A) (450 g) was added to ethylacetoacetate (277.2 g) and methylated spirit 740 P (1.25l). To this was added sodium hydroxide pellets (188.5 g in total dissolved in methylated spirit 740 P (800 ml) and water (840 ml)). The mixture was then heated to reflux for total of 17 hours and then cooled to room temperature. The resulting solid was filtered off, washed with methylated spirit 740 P and dried under vacuum 40° C. to give Intermediate (B). (Yield=102.2 g at 33% Strength).

Stage (c): Diazotisation and Coupling 2-carboxy-4-sulphoaniline (60.75 g at 89% strength) was dissolved in water (600 mls) at pH 7–8 by addition of 2N NaOH (aq) and sodium nitrite (19.0 g) added. This solution was then added to a mixture of conc. HCl (162 mls) in water (200 g). The mixture was stirred at for 2 hours whilst maintaining the temperature below 10° C. Excess nitrous acid was then destroyed by addition of sulphamic acid.

To above mixture was added a solution of Intermediate B (76.8 g at 33% strength) in water (800 ml). The resulting mixture, diluted to 71 in total to effect stirring, was adjusted to pH 7 by addition of 2N NaOH. The mixture was stirred over night, salted to 15% w/v with NaCl and the pH adjusted to 5–6 by addition of conc. HCl. The resulting solid was filtered off washed and pulled dry in a filter.

Stage (d):

Purification

The product of stage (c) was re-dissolved in distilled water (approx. 41) at pH 9.5 and desalinated by reverse osmosis. The solution was then screened and the water evaporated to leave the title product in the form of its sodium salt. (Yield=117 g).

EXAMPLES 2 TO 12

Further compounds of the Formula:

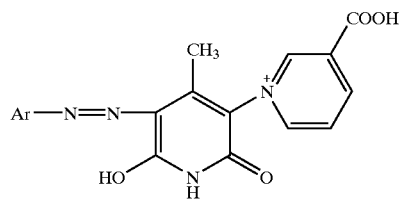

were prepared in the sodium salt form by diazotising the amine of the formula Ar—$NH_2$ shown in Table 1 and coupling the resulting diazonium salt with Intermediate (B) using an analogous process to that described in Stages (c) and (d) of Example 1.

| Example | Amine (Ar—$NH_2$) |
|---|---|
| 2 | 3-$SO_3H$-aniline |
| 3 | 2-$SO_3H$-aniline |
| 4 | 4-$CH_3$-2-$SO_3H$-aniline |
| 5 | 4,5-di-$CH_3$-2-$SO_3H$-aniline |
| 6 | 2-$CH_3$-4-$SO_3H$-aniline |
| 7 | 4-$NHCOCH_3$-2-$SO_3H$-aniline |
| 8 | 2-$CH_3$-4-$COOH$-aniline |
| 9 | 2,5-di-$COOH$-aniline |
| 10 | 3-$CH_3$-2-$COOH$-aniline |
| 11 | 4-$Cl$-2-$COOH$-aniline |
| 12 | 3,5-di-$COOH$-aniline |
| 13 | indane-$SO_3H$-amine |

When the compounds in Examples 1 to 13 are formulated into inks and applied to a substrate by means of an ink jet printer they provide bright yellow prints which exhibit a high chroma and light-fastness.

EXAMPLE 14

Inks

Inks according to the formulations shown in Tables 2 and 3 may be prepared. In Tables 2 and 3 the Dye described in the first column is the Dye made in the above examples of the same number. Numbers quoted in the second column onwards refer to the number of parts of the relevant ingredient and all parts are by weight. The inks may be applied to paper by thermal or piezo ink jet printing.

The following abbreviations are used in Table 2 and 3:
PG=propylene glycol
DEG=diethylene glycol
NMP=N-methyl pyrrolidone
DMK=dimethylketone
MEOH=methanol
2P=2-pyrrolidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol
GLY=glycerol
P-1,5=Pentane-1,5-diol

EXAMPLES 15 TO 25

Dye Mixtures

The dye mixtures described in Table 4 may be prepared. In row 2 the figure in brackets refers to the number of parts by weight of the dye described in the previous examples. CID means C.I.Direct, CIR means C.I.Reactive and CIA means C.I.Acid.

TABLE 2

| Dye | Dye Content | Water | PG | DEG | NMP | P-1,5 | NaOH | Na Stearate | GLY | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 3 | 10.8 | 90 | 5 | | | | | | 5 | | | |
| 5 | 10.0 | 80 | 2 | 6 | 2 | 5 | | | 1 | | 4 | |
| 7 | 1.8 | 80 | | 5 | | | | | | | 15 | |
| 9 | 2.6 | 84 | | | 11 | | | | | | 5 | |
| 1 | 3.3 | 80 | 2 | | | 10 | | | | 2 | | 6 |
| 2 | 12.0 | 90 | | | 7 | | 0.3 | | 3 | | | |
| 1 | 5.4 | 69 | 2 | 20 | 2 | 1 | | | | | 3 | 3 |
| 12 | 6.0 | 91 | | | 4 | | | | | 5 | | |

TABLE 3

| Dye | Dye Content | Water | PG | DEG | NMP | CET | TBT | TDG | BDL | PHO | 2P | P12 |
|---|---|---|---|---|---|---|---|---|---|---|---|---|
| 3 | 3.0 | 80 | 15 | | | 0.2 | | | | | 5 | |
| 5 | 9.0 | 90 | | 5 | | | | | | 1.2 | | 5 |
| 7 | 1.5 | 85 | 5 | 5 | | 0.15 | 5.0 | 0.2 | | | | |
| 8 | 2.5 | 90 | | | 6 | 4 | | | | 0.12 | | |
| 11 | 3.1 | 82 | 4 | 8 | | 0.3 | | | | | | 6 |
| 1 | 0.9 | 85 | | | 10 | | | | 5 | 0.2 | | |
| 4 | 8.0 | 90 | | 5 | 5 | | | 0.3 | | | | |
| 6 | 4.0 | 70 | | 10 | 4 | | | | 1 | | 4 | 11 |
| 7 | 2.2 | 75 | 4 | 10 | 3 | | | | 2 | | 6 | |
| 8 | 10.0 | 91 | | | 6 | | | | | | 3 | |
| 9 | 9.0 | 76 | | 9 | 7 | | 3.0 | | | 0.95 | 5 | |
| 11 | 5.0 | 78 | 5 | 11 | | | | | | | 6 | |
| 10 | 5.4 | 86 | | | 7 | | | | | | 7 | |
| 4 | 2.1 | 70 | 5 | 5 | 5 | 0.1 | 0.2 | 0.1 | 5 | 0.1 | 5 | |
| 2 | 2.0 | 90 | | | 10 | | | | | | | |
| 1 | 2 | 88 | | | | | | 10 | | | | |
| 3 | 5 | 78 | | | 5 | | | 12 | | | 5 | |
| 1 | 8 | 70 | 2 | | 8 | | | 15 | | | 5 | |
| 4 | 10 | 80 | | | | | | 8 | | | 12 | |
| 5 | 10 | 80 | | | 10 | | | | | | | |

TABLE 4

| Example Dye from Example No. | 15 1(10) | 16 2(75) | 17 3(60) | 18 4(15) | 19 1(95) | 20 5(92) | 21 7(11) | 22 6(15) | 23 8(40) | 24 9(77) | 25 10(63) |
|---|---|---|---|---|---|---|---|---|---|---|---|
| CID Yellow 132 | 10 | | | | | | | 4 | | 7 | |
| CID Yellow 142 | | 25 | | 5 | | | | | | | |
| CID Yellow 86 | | | | 5 | | | | | | 6 | 37 |

TABLE 4-continued

| Example Dye from Example No. | 15 1(10) | 16 2(75) | 17 3(60) | 18 4(15) | 19 1(95) | 20 5(92) | 21 7(11) | 22 6(15) | 23 8(40) | 24 9(77) | 25 10(63) |
|---|---|---|---|---|---|---|---|---|---|---|---|
| CIA Yellow 23 | | | 10 | | | | | | | 10 | |
| CIA Blue 9 | | | | 5 | | | | | | | |
| CIA Blue 307 | | | | | 8 | | | | | | |
| CID Black 168 | | | | | | 89 | | | | | |
| CI Food Black 2 | 80 | | | 75 | | | | | 30 | | |
| CID Black 19 | | 30 | | | | | | | 30 | | |
| CID Black 195 | | | | | | | | 81 | | | |

What is claimed is:

1. A compound of Formula (1) and salts and tautomers thereof:

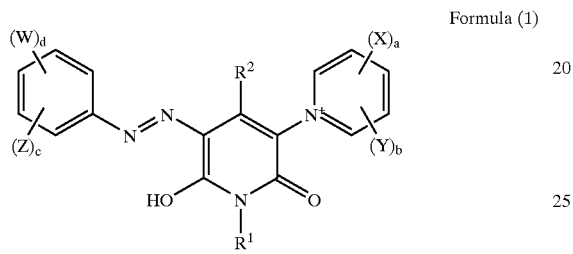

Formula (1)

wherein:

$R^1$ and $R^2$ each independently is H, optionally substituted alkyl, optionally substituted aryl or optionally substituted arylalkyl;

each W and each X independently is —COOH, —SO$_3$H, —PO$_3$H$_2$ or alkyl substituted by one or more of —COOH, —SO$_3$H or —PO$_3$H$_2$;

each Y and each Z independently is a substituent other than those defined for W and X;

a and d each independently is 1 to 5;

b and c each independently is 0 to 4;

(a+b) has a value of 5 or less; and (c+d) has a value of 5 or less.

2. A compound according to claim 1 wherein:

Y and Z are each independently optionally substituted aryl, optionally substituted arylalkyl. halogen, nitro, cyano. —CF$_3$, —OR$^3$, —NR$^4$R$^5$, —SR$^5$, —C(O)R$^7$, —C(O)OR$^8$, —SO$_2$R$^9$, —SOR$^{10}$ or alkyl optionally substituted by a group other than —SO$_3$H, —COOH or —PO$_3$H$_2$; or Z together with the carbon atom to which it is attached and a second carbon atom in the phenyl group form a 5- or 6-membered ring;

wherein:

$R^3$ is H, optionally substituted alkyl or optionally substituted aryl;

$R^6$ is H, optionally substituted alkyl, optionally substituted aryl or a group of the Formula (2);

$R^7$, $R^8$, $R^9$ and $R^{10}$ are each independently optionally substituted alkyl or optionally substituted aryl;

$R^4$ and $R^5$ are each independently H, optionally substituted alkyl, optionally substituted aryl, —CO(C$_{1-6}$-alkyl), —CONH$_2$, a group of the Formula (2) or $R^4$ and $R^5$ together with the nitrogen to which they are attached form a 5- or 6- membered ring:

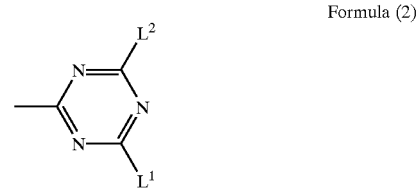

Formula (2)

$L^1$ and $L^2$ each independently is —OR$^{11}$, —SR$^{12}$ or —NR$^{13}$R$^{14}$;

$R^{11}$ and $R^{12}$ each independently is H, optionally substituted aryl or optionally substituted alkyl; and $R^{13}$ and $R^{14}$ each independently is H, optionally substituted aryl, optionally substituted alkyl, —CO(C$_{1-6}$alkyl) or —CONH$_2$ or $R^{13}$ and $R^{14}$ together with the nitrogen to which they are attached form an optionally substituted morpholine or piperazine ring.

3. A compound according to claim 2 wherein:

Y and Z are each independently optionally substituted aryl, optionally substituted arylalkyl, halogen, nitro, cyano, —CF$_3$, —OR$^3$, —NR$^4$R$^5$, —SR$^6$, —C(O)R$^7$, —C(O)OR$^8$, —SO$_2$R$^9$, —SOR$^{10}$ or alkyl optionally substituted by a group other than —SO$_3$H, —COOH or —PO$_3$H$_2$;

$R^3$, $R^4$, $R^5$, $R^7$, $R^8$, $R^9$ and $R^{10}$ are as defined in claim 2; and $R^6$ is H, optionally substituted alkyl or optionally substituted aryl.

4. A compound according to claim 1 wherein (a+b) has a value of 1, 2 or 3.

5. A compound according to claim 1 wherein (c+d) has a value of 1, 2 or 3.

6. A compound according to claim 1 wherein b is 0 and a is 1 or 2.

7. A compound according to claim 1 wherein b is 0, a is 1 and X is —COOH attached at the 3-position in the pyridinium ring.

8. A compound according to claim 1 of the Formula (3) and salts thereof:

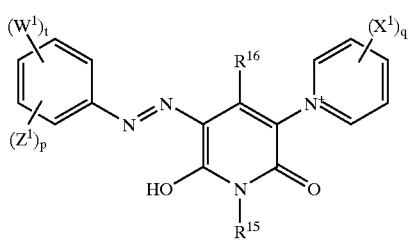

Formula (3)

wherein:
each $X^1$ and each $W^1$ independently is —COOH, —$SO_3$H or $C_{1-6}$-alkyl substituted by —COOH or —$SO_3$H;
$R^{15}$ is H or $C_{1-6}$-alkyl optionally substituted by —OH, —$SO_3$H or —COOH;
$R^{16}$ is $C_{1-4}$-alkyl;
each $Z^1$ independently is optionally substituted phenyl, halogen, nitro, cyano, —$CF_3$, —$OR^3$, —$NR^4R^5$, —$SR^6$, —$C(O)R^7$, —$C(O)OR^8$, —$SO_2R^9$, —$SOR^{10}$ or alkyl optionally substituted by a group other than —COOH, —$SO_3$H or —$PO_3H_2$;
q is 1 or 2;
t is 1 or 2; and
p is 0, 1 or 2;
wherein
$R^3$ is H, optionally substituted alkyl or optionally substituted aryl;
$R^4$ and $R^5$ are each independently H, optionally substituted alkyl, optionally substituted aryl, —CO($C_{1-6}$-alkyl), —$CONH_2$, a group of the Formula (2) or $R^4$ and $R^5$ together with the nitrogen to which they are attached form a 5- or 6- membered ring:

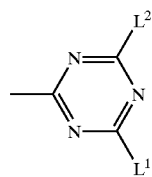

Formula (2)

$R^6$ is H, optionally substituted alkyl, optionally substituted aryl or a group of the Formula (2);
$R^7$, $R^8$, $R^9$ and $R^{10}$ are each independently optionally substituted alkyl or optionally substituted aryl;
$L^1$ and $L^2$ each independently is —$OR^{11}$, —$SR^{12}$ or —$NR^{13}R^{14}$;
$R^{11}$ and $R^{12}$ each independently is H, optionally substituted aryl or optionally substituted alkyl;
and
$R^{13}$ and $R^{14}$ each independently is H, optionally substituted aryl, optionally substituted alkyl, —CO($C_{1-6}$-alkyl) or —$CONH_2$ or $R^{13}$ and $R^{14}$ together with the nitrogen to which they are attached form an optionally substituted morpholine or piperazine ring.

9. A compound according to claim 1 wherein the compound is in the form of a lithium, sodium, potassium, ammonium or substituted ammonium salt, or a mixed salt thereof.

10. A composition comprising two or more compounds according to claim 1.

11. A composition comprising one or more compounds according to claim 1 and one or more dyes other than a compound of Formula (1).

12. An ink comprising a compound according to any one of claims 1 to 9 and a medium.

13. An ink comprising:
(a) from 0.01 to 30 parts in total of one or more compound(s) according to any one of claims 1 to 9; and
(b) from 70 to 99.99 parts of a liquid medium or a low melting point solid medium;
wherein all parts are by weight and the number of parts of (a)+(b)=100.

14. An ink comprising:
(a) from 0.01 to 30, parts of a compound according to any one of claims 1 to 9;
(b) from 75 to 98 parts water; and
(c) from 2 to 30 parts of water-soluble organic solvent; wherein all parts are by weight and the sum of the parts (a)+(b)+(c)=100.

15. A process for printing an image on a substrate comprising applying thereto by means of an ink jet printer an ink containing a compound according to any one of claims 1 to 9.

16. A paper, an overhead projector slide or a textile material printed with an ink according to claim 12.

17. An ink jet printer cartridge containing an ink, wherein the ink contains a compound according to any one of claims 1 to 9.

18. An ink comprising a composition according to claim 10 and a medium.

19. An ink comprising a composition according to claim 11 and a medium.

20. A paper, an overhead projector slide or a textile material printed by means of a process according to claim 15.

* * * * *